United States Patent [19]
Carpenter

[11] 3,852,859
[45] Dec. 10, 1974

[54] CUTTING TOOL
[75] Inventor: Edwin A. Carpenter, Milwaukee, Wis.
[73] Assignee: Allied Tool Products, Inc., Milwaukee, Wis.
[22] Filed: Mar. 22, 1972
[21] Appl. No.: 237,157

[52] U.S. Cl............ 29/96, 10/101, 408/144, 29/95 R
[51] Int. Cl............................................. B26d 1/00
[58] Field of Search .......... 29/96; 10/101; 408/144, 408/239

[56] References Cited
UNITED STATES PATENTS

| 613,264 | 11/1898 | Goddard | 29/96 |
| 3,088,141 | 5/1963 | Tansey | 10/101 |
| 3,205,558 | 9/1965 | Stier | 29/96 |
| 3,518,737 | 7/1970 | Hood | 29/96 |
| 3,754,309 | 8/1973 | Jones et al. | 29/96 R |

Primary Examiner—Leonidas Vlachos
Attorney, Agent, or Firm—Fred Wiviott; Ralph G. Hohenfeldt

[57] ABSTRACT

A thread cutting tool including a removable cutting insert and a tool holder having engagable co-acting surfaces on the sides of the insert opposite that acted upon by the cutting forces so that these forces tend to hold in a fixed relationship relative to the holder. The insert is mounted on the tool at an angle substantially one-half the angle of the cutting tip so that only a single ground face is required.

14 Claims, 10 Drawing Figures

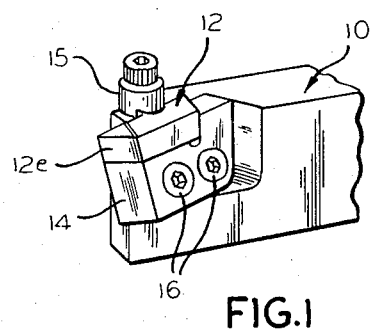
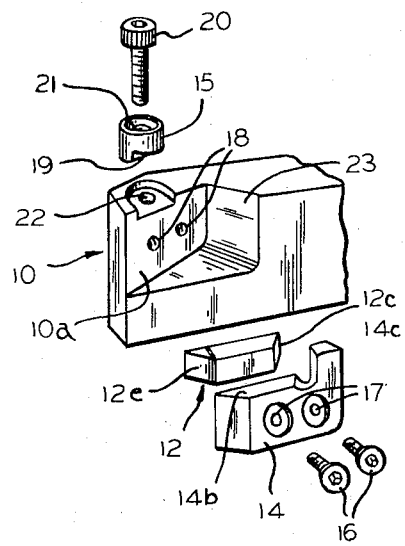
FIG.1
FIG.2
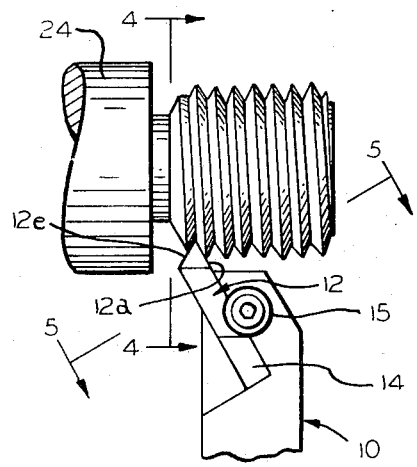
FIG.3
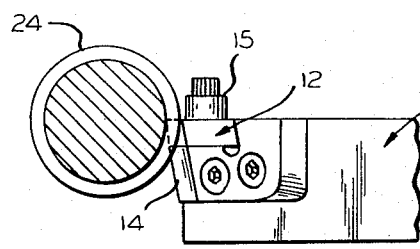
FIG.4
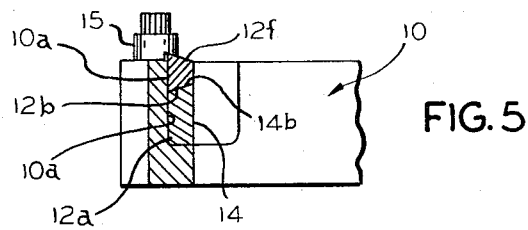
FIG.5
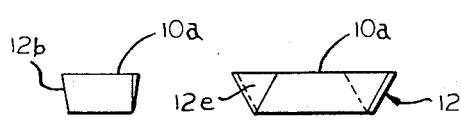
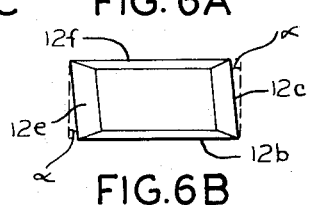
FIG.6C   FIG.6A
FIG.6B
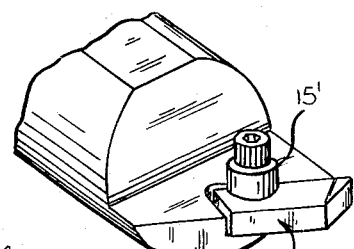
FIG.8
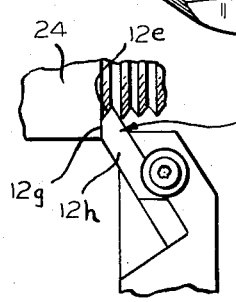
FIG.7

CUTTING TOOL

BACKGROUND OF THE INVENTION

Thread cutting tools conventionally include a cutting insert secured in a fixed position to a tool holder. In prior art tools, cutting forces acting against the insert clamp, tended to cause the insert to chatter and shift its position in the holder. This adversely affected the proper performance of a cutting operation. Maintaining the position of the insert is especially important when used on numerically controlled machines where various tools are automatically positioned for different machining operations. If the insert is not securely held in the holder, the cutter position will not be repeated accurately on successive workpieces with a resulting variation in the machined products.

The present invention eliminates many of the foregoing problems by providing an insert and a cooperating holder configured in such a manner that cutting forces on the insert act to maintain the position of the insert in the tool holder. Thus, the insert is not solely dependent upon the securing clamp to maintain it in the desired position relative to the holder.

In prior art, the cutting point of thread cutting inserts normally comprise two cutting faces forming a 60° angle. To resharpen inserts of this type, it is necessary to grind both faces to keep the apex of the cutting surfaces in a plane bisecting the angle formed by them. The present invention utilizes a mounting face and a second face forming a 60° angle with it to provide a cutting tip. To resharpen only the second face is ground and the apex remains in the plane of the mounting surface.

OBJECT OF THE INVENTION

An object of the invention is to provide a thread cutting tool whose insert will not tend to move under the influence of cutting forces.

A further object of the invention is to provide a thread cutting insert which can be sharpened by grinding a single cutting face.

Another object of the invention is to provide a thread cutting insert having two cutting points which is reversible in its holder.

These and other objects and advantages of the present invention will become more apparent from the detailed description thereof taken with the accompanying drawings.

BRIEF DESCRIPTION OF THE DRAWINGS

FIG. 1 is a perspective view of the thread cutting tool according to one embodiment of the invention;

FIG. 2 is an exploded perspective view of the tool illustrated in FIG. 1;

FIG. 3 is a top plane view of the embodiment of FIG. 1;

FIG. 4 is a view taken along line 4—4 of FIG. 3;

FIG. 5 is a view taken along FIG. 5—5 of FIG. 3;

FIGS. 6A, 6B and 6C are various views of the cutting insert of the tool illustrated in FIG. 1;

FIG. 7 is a top plane view of an alternate embodiment of the invention; and

FIG. 8 is a perspective view of yet another embodiment of the invention.

DESCRIPTION OF THE PREFERRED EMBODIMENTS

With reference to FIGS. 1–5, the thread cutting tool according to the preferred embodiment of the invention is shown to include a tool holder 10 and a cutting insert 12. The holder 10 may be provided with an insert supporting anvil 14 and a clamp 15. The anvil may be attached to the holder 10 by any suitable means such as screws 16 which pass through openings 17 in anvil 14 and are received in threaded holes 18 in surface 10a of holder 10. Clamp 15 has an insert engaging notch 19 formed in its lower end and is mounted by means of a screw 20 which passes through an opening 21 in clamp 15 and is received in a threaded hole 22 in the top of holder 10.

The holder may be provided with an insert receiving recess 23 having the side surface 10a which is preferably formed at an angle of 30° relative to a vertical plane containing the longitudinal axis of holder 10. The insert 12 and anvil 14 respectively include locating surfaces 12a and 14a which are mounted against surface 10a. In addition, the anvil 14 has an insert receiving notch 15 defined by surfaces 14b and 14c each of which are formed at an acute angle relative to surface 10a of holder 10. The insert 12 is formed with surfaces 12b and 12c which are complimentary with and engage surfaces 14b and 14c when insert 12 is mounted in its operative position. More specifically, the surface 14b extends downwardly and inwardly relative to surface 10a and surface 14c extends obliquely down and toward the rear from top to bottom and in and toward the rear from the outer to the inner side. The insert 12 is shown in FIG. 5 to be generally trapezoidal in a cross section taken through its longitudinal axis wherein surface 12b is complimentary with surface 14b when surface 12a engages surface 10a of holder 10. Similarly, the surface 12c is complimentary with surface 14c when the insert is in its operative position shown in the drawings. The engagement between surfaces 12b and 14b tends to prevent movement of the insert 12 away from surface 10a. Further because surface 14c overlays surface 12c, upward tilting movement of this end of the insert is prevented.

It will be appreciated that when the insert is engaged with a work piece 24, as seen in FIGS. 3 and 4, force components on insert 12 will act downwardly as viewed in FIG. 4 and to the right as viewed in FIG. 3. These forces will tend to force insert faces 12a and 12b against the surfaces 10a and 14b and face 12c against surface 14c. Accordingly, these forces tend to supplement the clamp 15 and thereby to hold insert 12. Also these forces would tend to hold insert 12 in position during operation should the clamp 15 become loosened.

In the preferred embodiment of the invention, the opposite end faces 12c and 12e of the insert 12 are formed at the same angle relative to mounting face 12a and in opposite directions. In the standard thread cutter, this angle is approximately 60°. Also the faces 12c and 12e are tilted at a slight angle as shown in FIG. 6B. This provides both clearance at the cutting end but also a mating surface for surface 14c of anvil 14. Similarly, the bottom and top surfaces 12b and 12f of the insert 12 are formed at the same angle relative to the surface 12a and in the opposite directions.

Referring now specifically to FIG. 3, the mounting of insert 12 on the 30° surface 10a and the 60 degree surface angle between surfaces 12a and 12e provides an internal included angle of 60° presented by insert 12 to the work piece 24. In addition, a plane parallel to the longitudinal axis of holder 10 and passing through the apex of the faces 12a and 12e, bisects the angle. In this manner, the 60° cutting tip on insert 12 is provided with only a single cutting face 12c or 12e nominally referred to in the trade as the 30° front face, at each end requiring grinding. Further, the arrangement of faces permits either end to be used for cutting. More specifically, when the insert is rotated 180 degrees about an axis perpendicular to surface 12a end face 12e will fit beneath surface 14c and face 12c will be in a proper cutting position.

Referring now to FIG. 7, the insert 12 may have a clearance surface 12g ground between surfaces 12d and 12e and in a direction generally parallel to the longitudinal axis of holder 10. This permits the thread to be cut down to the shoulder of the work piece 24.

Yet another alternative embodiment of the present invention is shown in FIG. 6. In this configuration, the insert 12' is oriented to perform internal threading operations whereas in the embodiment of FIGS. 1–7, insert 12 is oriented for external threading cutting, although neither embodiment need be limited to such operations. The threading tool in FIG. 8 includes a tool holder 10', cutting insert 12' and a clamp 15'. The embodiment of FIG. 6 also illustrates that the anvil may be eliminated with the insert receiving surface formed directly in the holder 10'. More specifically, holder 10' has a recess formed therein having mounting surfaces with substantially the same configuration as surfaces 10a, 14b and 14c of the embodiment of FIGS. 1–7. Insert 12' has substantially the same configuration as insert 12 so that it will not be described for the sake of brevity in detail. The insert 12' is clamped in place against surfaces 10a, 14b and 14c in the same manner as that of the embodiment in FIGS. 1–7.

While only a few embodiments of the invention have been illustrated and described, it is not intended to be limited thereby but only by the scope of the appended claims.

I claim:

1. A thread cutting tool including a thread cutting insert and insert holding means, said insert having a cutting tip formed at one end for cutting a thread in a work piece, a component of the force on said insert resulting from the engagement between said insert and said work piece being directed in a first direction, said insert holding means having a first support surface, said insert having a first face on the side thereof away from the direction of said force component and engaging said first support surface, said insert holding means having a second support surface formed at an acute angle relative to said first support surface, said second support surface engaging said insert at the end thereof opposite said tip and acting on said opposite end in a direction generally parallel to the direction of said force component.

2. The cutting tool set forth in claim 1 wherein said insert has a second face formed at an actue angle relative to said first face, said holding means having a third support surface lying in a plane generally parallel to said first direction, said third support surface being formed at an acute angle relative to said second support surface, said second face engaging said third support surface.

3. A thread cutting tool including a thread cutting insert and insert holding means, said insert having a cutting tip formed at each end for cutting a thread in a rotating work piece, a component of the force on said insert resulting from the engagement between said insert and said work piece being directed in a first direction, said insert holding means having a first support surface, said insert having a first face on the side thereof away from the direction of said force component and engaging said first support surface, said insert holding means having a second surface engaging said insert at the end thereof opposite the end which contacts said work piece, said insert having a second face formed at an acute angle relative to said first face, said holding means having a third support surface lying in a plane generally parallel to said first direction, said third support surface being formed at an acute angle relative to said second support surface, said second face engaging said third support surface, and said cutting tips being formed by intersecting faces on said insert, said intersecting faces being formed at substantially the same angle for each of said cutting tips, said second surface being complimentary to one of the faces of each of said cutting tips, said second surface being engageable with one face of one cutting tip when the insert is in position on said insert holding means and acting on said one face generally in the same direction as said force component.

4. The cutting tool set forth in claim 2 wherein said insert has a third face on the side thereof opposite said first face and releaseable clamping means on said insert holding means and face engageable with said third insert face.

5. The cutting tool set forth in claim 2 wherein said second surface lies in the plane which intersects each of said first and third surfaces at an acute angle.

6. A thread cutting tool including a thread cutting insert and insert holding means, said insert having a cutting tip formed at one end for cutting a thread in a rotating work piece, a component of the force on said insert resulting from engagement between said insert and said work piece being directed in a first direction, said insert holding means having a first support surface, said insert having a first face on the side thereof away from the direction of said force component and engaging said first support surface, said insert holding means having a second surface engaging said insert at the end thereof opposite said tip and acting on said opposite end generally in the same direction as said force component, said insert having a second face formed at an acute angle relative to said first face, said holding means having a third support surface lying in a plane generally parallel to said first direction, said third support surface being formed at an acute angle relative to said second support surface, said second face engaging said third support surface, and said holding means including a first holding member and a second holding member removably mounted on said first holding member, said first and second surfaces being formed on said second holding member and said third surface being formed on said first holding member.

7. The cutting tool set forth in claim 1 wherein said insert has a clamping face on the side thereof opposite said first face and releaseable clamping means on said insert holding means and face engageable with said clamping face.

8. A thread cutting tool including a thread cutting insert and insert holding means, said insert having cutting tips formed at each end for cutting a thread in a rotating work piece, a component of the force on said insert resulting from the engagement between said insert and said work piece being directed in a first direction, said insert holding means having a first support surface, said insert having a first face on the side thereof away from the direction of said force component and engaging said first support surface, said insert holding means having a second surface engaging said insert at the end thereof opposite the end which contacts said work piece, and said cutting tips being formed by intersecting faces on said insert, said intersecting faces being formed at substantially the same angle for each of said cutting tips, said second surface being complimentary to one of the faces of each of said cutting tips, said second surface being engageable with one face of one cutting tip when the insert is in position on said insert holding means and acting on said one face generally in the same direction as said force component.

9. The cutting tool set forth in claim 8 wherein said insert has a clamping face on the side thereof opposite said first face and releaseable clamping means on said insert holding means and face engageable with said clamping insert face.

10. The cutting tool set forth in claim 9 wherein said insert has a second face formed at an acute angle relative to said first face, said holding means having a third support surface lying in a plane generally parallel to said first direction, said third support surface being formed at an acute angle relative to said second support surface, said second face engaging said third support surface.

11. The cutting tool set forth in claim 10 wherein said holding means includes a first holding member and a second holding member removably mounted on said first holding member, said first and second surfaces being formed on said second holding member and said third surface being formed on said first holding member.

12. The cutting tool set forth in claim 11 wherein said second surface lies in the plane which intersects each of said first and third surfaces at an acute angle.

13. The thread cutting tool set forth in claim 12 wherein said holding means has a longitudinal axis, means for mounting said insert with said second face disposed at a predetermined acute angle relative to said longitudinal axis, the faces forming said cutting tip intersecting at a second acute angle, said first and second acute angles being substantially equal whereby the plane passing through the intersection of said first and second surfaces and parallel to the longitudinal axis of said holder bisects an angle formed by said faces.

14. The cutting tool set forth in claim 13 wherein the first and second angles are each substantially 60°.

* * * * *